Patented Aug. 5, 1930

1,772,283

UNITED STATES PATENT OFFICE

CLARENCE F. HAMILTON, OF DETROIT, MICHIGAN

PROCESS FOR TINNING AND CLEANING SOLDERING IRONS

No Drawing.    Application filed January 23, 1928. Serial No. 248,973.

My invention relates to a new and useful improvement in a process for tinning and cleaning soldering irons, and has for its object the provision of a process for tinning and cleaning soldering irons whereby a considerable saving will result from carrying out the process.

In the well known method as now practised, it is customary, after heating the soldering irons to a desired heat, to rub the surfaces of the soldering iron over a block or brick of salammoniac. This causes considerable smoke and produces gases, so that it is quite unsanitary for the operator, and after prolonged work in this line, the health of the operator becomes injured. As the block of salammoniac is used a recess is formed in it, and when the solder is applied to the iron for tinning purposes, the solder flows into the recess, and when the soldering iron is placed in the recess a spurting of the solder is effected, often injuring the operator, and particularly when it strikes the eye of the operator. Furthermore, a considerable loss of solder is brought about through the use of the present process as this solder, after filling the recess, flows over the side of the block of salammoniac. In the present process also the salammoniac is not evenly distributed over the soldering iron, and the soldering iron is in a state that when it is necessary to clean it for a retinning, considerable filing becomes necessary, and the adhering of the salammoniac to the soldering iron is such that the files are worn quickly on account of the hardness of the material, so that where the process is extensively used, the file item is a considerable expense.

An object of the present invention is to provide a process which will avoid the disadvantages enumerated, and render the operation sanitary, safe, quick, easy, and an economical one, assuming an even and uniform distribution of the salammoniac over the soldering iron.

To this end I employ a solution of water and salammoniac, the solution consisting in volume of two-thirds water and one-third salammoniac, although it is believed apparent that the use of a greater or less amount of salammoniac may be employed, the presence of a less amount of salammoniac requiring slightly longer to complete the process. In practical operation, however, the proportion of one-third salammoniac and two-thirds water has proven most satisfactory.

In carrying out the process after the salammoniac has been dissolved in the water, the soldering iron is heated to the desired degree and thrust into the solution and quickly withdrawn. The iron is then thrust again into the solution and quickly withdrawn for possibly three or four times, and at each withdrawal enough of the solution will adhere, so that as the number of dips is repeated, eventually there is spread over the soldering iron in a uniform layer, a deposit of salammoniac, the iron evaporating the water. In this way there is no danger of the solder spurting, nor is there any smoke or gas or disagreeable odor.

After the soldering iron has been dipped sufficiently to leave the deposit of salammoniac on the iron, the solder is rubbed over the surface of the iron and the iron again dipped in the solution to spread the solder evenly, and the tinning process thus completed.

As the operator continues to use the soldering iron, heating it constantly between actual applications of it to the solder, it becomes desirable to clean the iron, and this is done by thrusting the iron occasionally into the solution. This not only cleans the solder, but assures the spreading of the solder over the copper soldering iron quite evenly, and particularly when first tinning. After the tinning has been completed, the dipping of the soldering iron into the solution shines and cleans the solder and removes all dirt.

While I have illustrated and described the preferred form of carrying out the process, I desire to cover such variations and modifications of the process, as well as the solution with which the same is performed, as come within the scope of the appended claims, and naturally evolved from the disclosure herein made.

Having thus described my invention what

I claim as new and desire to secure by Letters Patent is:

1. The process of tinning a soldering iron consisting in dipping the soldering iron in a heated state in a solution of salammoniac and quickly withdrawing the same therefrom, and repeating this operation until a sufficient deposit of salammoniac has been made on the soldering iron, and then applying to the contact surfaces of the soldering iron the solder.

2. The process of tinning a soldering iron consisting in dipping the soldering iron in a heated state in a liquid solution of salammoniac and quickly withdrawing the iron therefrom, and repeating the dipping of the soldering iron until the desired deposit of salammoniac on the soldering iron has been obtained.

3. The process of tinning a soldering iron consisting in dipping the soldering iron while heated in a liquid solution of salammoniac and quickly withdrawing the iron therefrom, and repeating the dipping of the soldering iron until the desired deposit of salammoniac on the soldering iron has been obtained, and applying to the surfaces of the soldering iron the desired coating of solder.

4. The process of tinning a soldering iron consisting in dipping the same while heated into a solution consisting of two-thirds liquid and one-third salammoniac, and removing the soldering iron quickly therefrom, and repeating the dipping of the soldering iron therein until a sufficient layer of salammoniac has been deposited on the soldering iron, and then applying to the contact surfaces of the soldering iron a layer of solder of desired thickness.

In testimony whereof I have signed the foregoing specification.

CLARENCE F. HAMILTON.